(12) United States Patent
Du et al.

(10) Patent No.: US 11,566,987 B1
(45) Date of Patent: Jan. 31, 2023

(54) METHOD FOR CALCULATING INTERNAL EXPLOSION LOAD SPEED BASED ON INCREMENTAL CRACK GROWTH DISTANCE OF PIPELINE

(71) Applicant: CHINA UNIVERSITY OF PETROLEUM (EAST CHINA), Qingdao (CN)

(72) Inventors: Yang Du, Qingdao (CN); Wenchun Jiang, Qingdao (CN); Fan Zhou, Qingdao (CN); Jinyang Zheng, Qingdao (CN); Chaojie Wang, Qingdao (CN); Guoming Chen, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 16/979,183

(22) PCT Filed: Jul. 22, 2019

(86) PCT No.: PCT/CN2019/096993
§ 371 (c)(1),
(2) Date: Sep. 9, 2020

(87) PCT Pub. No.: WO2021/012136
PCT Pub. Date: Jan. 28, 2021

(51) Int. Cl.
*G01N 3/313* (2006.01)
*G01N 29/12* (2006.01)

(52) U.S. Cl.
CPC ............ *G01N 3/313* (2013.01); *G01N 29/12* (2013.01)

(58) Field of Classification Search
CPC .............................. G01N 3/313; G01N 29/12
See application file for complete search history.

(56) References Cited

U.S. PATENT DOCUMENTS

2007/0157698 A1* 7/2007 Allaire ................. G01N 29/045
73/12.01

FOREIGN PATENT DOCUMENTS

| CN | 105181492 | * | 12/2015 |
| CN | 105181492 A | | 12/2015 |

(Continued)

OTHER PUBLICATIONS

"Numerical Simulation of the Crack Propagation in a Pipeline Subjected to Third-party Damage" by Marshall Jackson, pp. ix, xii, 1-121; Thesis submitted to the Faculty of Fraduate Studies of The University of Manitoba, Winnipeg (Year: 2015).*

(Continued)

*Primary Examiner* — Catherine T. Rastovski
*Assistant Examiner* — Kaleria Knox
(74) *Attorney, Agent, or Firm* — W&G Law Group

(57) ABSTRACT

The present disclosure discloses a method for calculating an internal explosion load speed based on an incremental crack growth distance of a pipeline. The method includes steps of: respectively measuring at least three groups of distances between neighboring markings on forward and backward crack surfaces, and calculating the average values respectively to obtain the average incremental growth distances of forward and backward cracks; calculating the natural vibration frequency of the pipeline; and setting the ratio of backward crack speed to forward crack speed of the pipeline, then calculating the internal explosion load speed of the pipeline by a formula. The present disclosure provides a new effective method for calculating the internal explosion load speed based on the available parameters of the ruptured pipeline after explosion, which can provide a comparatively accurate estimation of internal explosion load speed, thereby providing references for inferring the explosion type occurred in the pipeline.

5 Claims, 1 Drawing Sheet

(56) References Cited

FOREIGN PATENT DOCUMENTS

| CN | 107219119 | * | 9/2017 | ............... G01N 3/08 |
| CN | 108710721 | * | 10/2018 | ............. G06F 30/23 |
| CN | 108710721 A | | 10/2018 | |
| JP | S5443865 A | | 4/1979 | |

OTHER PUBLICATIONS

Fuyin Gao et al., "Numerical simulation on fracture mechanics behavior of high-pressure gas pipeline" pp. 208-213;College of Field Engineerign, The Armu Engineering University of PLA, Nanjing, 210007, China ISSN Print 2345-0533, ISSN Online 2538-8479, Kaunas, Lithuania (Year: 2018).*

Thesis by Tong Wa Chao "Gaseous Detonation-Driven Fracture of Tubes", pp. xiv,xxix,xxxi 1-274, Mar. 2004, California institute of Technology Pasadena, California (Year: 2004).*

Yang Du, et.al., "Xonsequences assessment of explosions in pipes using coupled FEM-SPH method" Jornal of Loss Prevention in the Process Industies 43 (2016) pp. 549-558 (Year: 2016).*

International Search Report (PCT/CN2019/096993); dated Apr. 26, 2020.

"Dynamic Fracture Behavior and Consequence Assessment Method of Gas Pipe Explosion" [Jun. 30, 2018] (Du, Yang).

"Numerical prediction on dynamic fracture of tubes subjected to internal gaseous detonation" (Aug. 31, 2018) [Du, Yang at al.].

"Consequences assessment of explosions in pipes using coupled FEM-SPH method" (Sep. 30, 2018) [Du, Yang et al.].

* cited by examiner

METHOD FOR CALCULATING INTERNAL EXPLOSION LOAD SPEED BASED ON INCREMENTAL CRACK GROWTH DISTANCE OF PIPELINE

TECHNICAL FIELD

The present disclosure relates to the field of pipeline explosion, and in particular, to a method for calculating an internal explosion load speed based on an incremental crack growth distance of a pipeline.

BACKGROUND

Pipelines are widely used in the fields of chemical industry, nuclear power, storage and transportation, etc., and the pipelines often transport dangerous liquid or gas that is flammable and explosive. In terms of a pipeline containing flammable gas, due to operation mistakes or other errors, air/oxygen may enter the pipeline, which may then lead to pipeline explosion accidents, such as the pipeline explosion accident of the Hamaoka Nuclear Power Plant occurred in Japan in 2001 (caused by the detonation of internal hydrogen-oxygen mixture). After a pipeline explosion occurs, a key point of accident investigation is to determine the explosion type (deflagration, detonation) inside the pipeline. Since the biggest difference between deflagration and detonation is that the speed of deflagration load is subsonic, while the speed of detonation load is supersonic, the inference of explosion type actually needs to estimate the movement speed of the explosion load. So far, there is no effective method for estimating the internal explosion load speed based on the relevant available parameters of an exploded pipeline.

SUMMARY

To solve the problem that the internal explosion load speed cannot be calculated or estimated based on the available parameters of a pipeline after explosion, the present disclosure provides a method for calculating the internal explosion load speed based on the incremental crack growth distance of the ruptured pipeline. The specific technical solution is as follows.

A method for calculating the internal explosion load speed based on the incremental crack growth distance of a pipeline is provided. In the method, a crack propagating in the same direction as the internal explosion load is defined as the forward crack, while a crack propagating in the opposite direction to the explosion load is defined as the backward crack, and the method includes:

a step S1 of respectively measuring, from the crack initiation position, at least three groups of distances between the neighboring markings on the forward and backward crack surfaces along the axial direction of pipeline, and then calculating the average values to obtain the average incremental growth distances $d_1$ and $d_2$ of the forward and backward cracks, respectively;

a step S2 of calculating the natural vibration frequency $f_0$ of the pipeline;

a step S3 of setting the ratio c of backward crack speed to forward crack speed of the pipeline, c generally ranging from 0.70 to 0.95; and calculating the internal explosion load speed D by the following formula:

$$D = \frac{d_1 d_2 f_0 (1+c)}{cd_1 - d_2}$$

Further, the ratio c of backward crack speed to forward crack speed of the pipeline is equal to 0.90.

Further, the distances between neighboring markings on forward and backward crack surfaces can be directly measured or obtained by detecting the changes of material mechanical properties along the crack path and marking the positions of damages.

Further, three to five groups of distances between the neighboring markings on forward and backward crack surfaces are required, respectively.

Further, for a pipeline with two ends fixed, the natural vibration frequency $f_0$ is calculated by the following formula:

$$f_0 = \frac{1}{2\pi R}\sqrt{\frac{E}{\rho(1-v^2)}}$$

where R is the radius of the pipeline, E is the elastic modulus of pipeline material, $\rho$ is the density of pipeline material, and v is a Poisson's ratio of pipeline material.

The present disclosure has the following beneficial effects.

The present disclosure provides a new effective method for calculating the internal explosion load speed based on the available parameters of the ruptured pipeline after explosion, which can provide a comparatively accurate estimation of internal explosion load speed, can then help to infer the explosion type (deflagration or detonation) occurred inside the pipeline by comparing the calculated explosion load speed with the sound velocity, and can provide important guidance for the analysis and investigation of pipeline explosion accidents.

DESCRIPTION OF EMBODIMENTS

The present disclosure will be described in details in the following with reference to the accompanying drawings and preferred embodiments. The objects and effects of the present disclosure will become clearer. It should be understood that the specific embodiments described herein are merely used to explain the present disclosure and are not intended to limit the present disclosure.

Under an internal explosion load, the crack first run axially along the pipeline after it initiates. Here, the crack run in the same direction as the internal explosion load is defined as the forward crack, and the crack run in the opposite direction is defined as the backward crack. The incremental crack growth leads to the formation of spaced damages along the crack path.

The present disclosure provides a method for calculating the internal explosion load speed based on the incremental crack growth distance of the pipeline, and the method specifically includes the following steps.

At a step S1, average incremental growth distances $d_1$ and $d_2$ of the forward and backward cracks are determined.

The incremental crack growth distance can be obtained by the following two methods.

Figure 1:
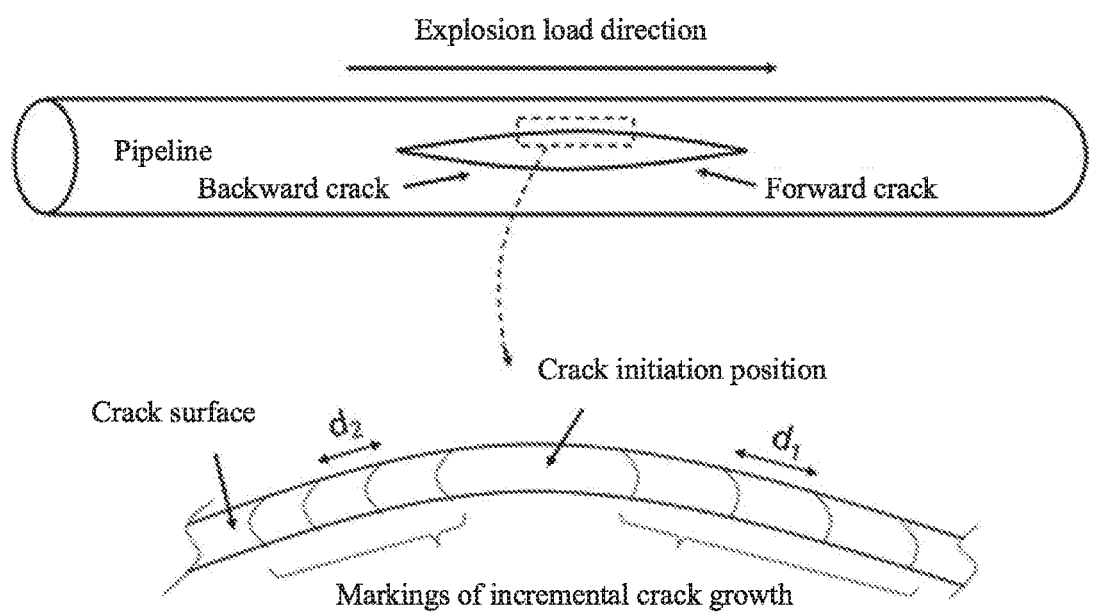
FIG. 1 is a schematic diagram illustrating the incremental crack growth of a pipeline.

In Method One, the distance between neighboring markings on the fracture surface is directly measured. For most metal pipelines, the incremental crack growth will form staircase markings on the fracture surface, as shown in FIG. 1, the distances between neighboring markings of the forward and backward cracks (no less than three groups, preferably three to five groups) are respectively measured, and then the average values are calculated to obtain the average incremental growth distances $d_1$ and $d_2$ of the cracks.

Figure 2:
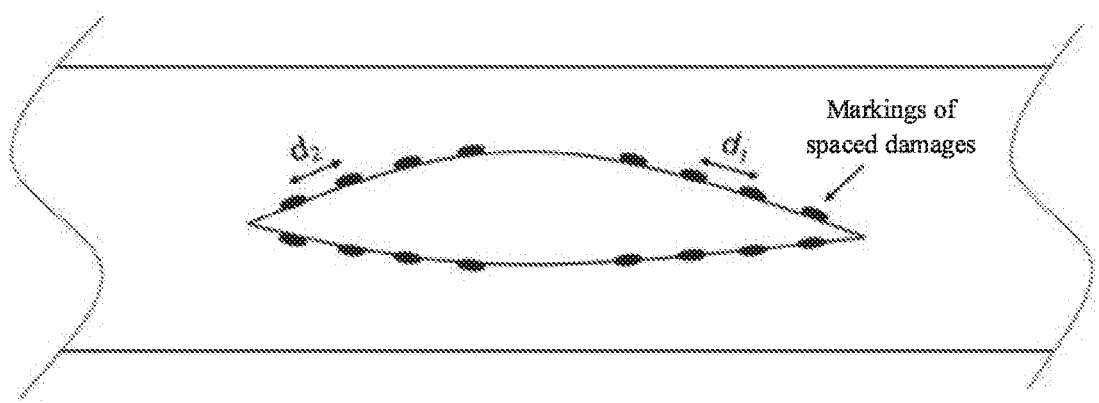
FIG. 2 is a schematic diagram illustrating the spaced damages along the crack path.

In Method Two, the spaced damages along the crack path are first marked and then the spacings are measured. The incremental crack growth distance in each cycle equals to the distance between the neighboring spaced damages along the crack path. For the case where staircase markings can not be identified by optical observation methods, the change of material mechanical properties (e.g. elastic modulus) along the crack path is first detected by specialized instruments like nano indenter, then the positions of damages are marked, as shown in FIG. 2. the distances between neighboring damages (no less than three groups, preferably three to five groups) are respectively measured, and then the average values are calculated to obtain the average incremental growth distances $d_1$ and $d_2$ of the forward and backward cracks.

At a step S2, the natural vibration frequency $f_0$ of the pipeline is calculated by the following formula.

$$f_0 = \frac{1}{2\pi R} \sqrt{\frac{E}{\rho(1-v^2)}}$$

where R is a radius of the pipeline, E is an elastic modulus of the pipeline material, $\rho$ is a density of the pipeline material, and v is the Poisson's ratio of the pipeline material. R can be obtained by measurement or consulting pipeline technical document. E, $\rho$, and v can be determined based on the specific material type of the pipeline, and can be also obtained through mechanical properties experiment on the cut-off material of the pipeline.

At a step S3, setting the ratio c of backward crack speed to forward crack speed of the pipeline. c generally ranges from 0.70 to 0.95. The internal explosion load speed D is calculated by the following formula.

$$D = \frac{d_1 d_2 f_0 (1+c)}{cd_1 - d_2}$$

In general, the forward crack speed is larger than that of the backward crack. The average speeds of forward and backward cracks are denoted as $v_1$ and $v_2$, respectively. we can have:

$$v_2 = cv_1$$

where c is a ratio of average backward crack speed to the average forward crack speed. According to researches, c usually ranges from 0.70 to 0.95. Preferably, for most cases, c can be taken as 0.90.

The method provided by the present disclosure is verified by a specific example as follows.

For a 6061-T6 aluminum alloy pipeline with 914 mm length, 41.28 mm outer diameter and 0.89 mm thickness. It ruptures under the internal gas explosion load of 6.1 MPa with the speed of 2400 m/s. According to the present disclosure, internal explosion load speed is calculated as follows.

Firstly, the average incremental crack growth distances of forward and backward cracks are measured and calculated, which are 8.9 mm and 6.4 mm, respectively. Namely, $d_1$=8.9 mm, and $d_2$=6.4 mm.

Then the natural vibration frequency of the pipeline is calculated as follows.

E, $\rho$, and v of 6061-T6 aluminum alloy material are 69 GPa, 2780 kg/m$^3$, and 0.33 respectively by checking literatures. Then the natural vibration frequency of the pipeline is calculated as follows.

$$f_0 = \frac{1}{2\pi R}\sqrt{\frac{E}{\rho(1-v^2)}} = \frac{1}{2\times 3.14 \times (0.04128 - 0.00089)/2}\sqrt{\frac{69\times 10^9}{2780\times(1-0.33^2)}} = 40.7 \text{ kHz}$$

In this calculation, c is taken as 0.90, and the internal explosion load speed of the pipeline is calculated as follows:

$$D = \frac{d_1 d_2 f_0(1+c)}{cd_1 - d_2} = \frac{0.0089\times 0.0064\times 40700\times (1+0.9)}{0.9\times 0.0089 - 0.0064} = 2735 \text{ m/s}$$

The relative deviation of the calculated explosion load speed is (2735−2400)/2400=14.0%.

Considering that the pipeline explosion is a highly transient process (characteristic time scale is μs), and there is a strong nonlinear fluid-solid coupling effect between the internal explosion wave and the pipeline, the crack speed is highly oscillating and generally can be up to 200 m/s to 900 m/s. It is a highly difficult task to estimate the internal explosion load speed through the available parameters of the ruptured pipeline after explosion occurs. The calculation deviation in this example is 14.0%, which indicates a high calculation accuracy of the present disclosure.

It should be understood by those skilled in the art that the above description merely illustrates preferred embodiments of the present disclosure and is not intended to limit the present disclosure. Although the present disclosure has been described in details with reference to the above-described embodiments, it should be understood by those skilled in the art that, it is still possible to modify the technical solutions described in the above embodiments or to equivalently replace some of the technical features therein. All modifications and equivalent replacements, etc. made within a concept and principle of the present disclosure shall fall into a scope of the present disclosure.

What is claimed is:

1. A method for calculating an internal explosion load speed based on an incremental crack growth distance of a pipeline, a crack propagating in the same direction as an explosion load being defined as a forward crack, while a crack propagating in the opposite direction to the explosion load being defined as a backward crack, and the method comprising:

step S1 of respectively measuring, from a crack initiation position, at least three groups of distances between neighboring markings on forward and backward crack surfaces along an axial direction of pipeline, and then calculating average values to obtain average incremental growth distances $d_1$ and $d_2$ of the forward and backward cracks, respectively;

step S2 of calculating a natural vibration frequency $f_0$ of the pipeline; and step S3 of setting a ratio c of a backward crack speed to a forward crack speed of the pipeline, c generally ranging from 0.70 to 0.95; and calculating the internal explosion load speed D by the following formula:

$$D = \frac{d_1 d_2 f_0 (1+c)}{cd_1 - d_2}.$$

2. The method for calculating an internal explosion load speed based on an incremental crack growth distance of a pipeline according to claim 1, wherein the ratio c of the backward crack speed to the forward crack speed of the pipeline is equal to 0.90.

3. The method for calculating an internal explosion load speed based on an incremental crack growth distance of a pipeline according to claim 1, wherein the distances between the neighboring markings on the forward and backward crack surfaces are directly measured or obtained by detecting changes of material mechanical properties along a crack path and marking positions of damages.

4. The method for calculating an internal explosion load speed based on an incremental crack growth distance of a pipeline according to claim 1, wherein three to five groups of distances between the neighboring markings on the forward and backward crack surfaces are required, respectively.

5. The method for calculating the internal explosion load speed based on the incremental crack growth distance of the pipeline according to claim 1, wherein for a pipeline with two ends fixed, the natural vibration frequency $f_0$ is calculated by the following formula:

$$f_0 = \frac{1}{2\pi R} \sqrt{\frac{E}{\rho(1-v^2)}}$$

where R is a radius of the pipeline, E is an elastic modulus of pipeline material, $\rho$ is a density of pipeline material, and v is a Poisson's ratio of pipeline material.

* * * * *